(12) United States Patent
Kurelek

(10) Patent No.: US 6,681,818 B2
(45) Date of Patent: Jan. 27, 2004

(54) HYDRAULIC CIRCUITS FOR TREE-HARVESTING KNUCKLE BOOMS

(75) Inventor: John Kurelek, Brantford (CA)

(73) Assignee: Tigercat Industries Inc, Brantford (CA)

( * ) Notice: Subject to any disclaimer, the term of this patent is extended or adjusted under 35 U.S.C. 154(b) by 0 days.

(21) Appl. No.: 10/201,312

(22) Filed: Jul. 24, 2002

(65) Prior Publication Data

US 2002/0179180 A1 Dec. 5, 2002

Related U.S. Application Data

(63) Continuation of application No. 09/655,858, filed on Sep. 6, 2000, now Pat. No. 6,443,196.
(60) Provisional application No. 60/157,125, filed on Oct. 4, 1999.

(51) Int. Cl.$^7$ ................................................ A01G 23/08
(52) U.S. Cl. ..................... 144/4.1; 60/421; 60/428; 91/33; 144/34.1; 144/336; 144/382
(58) Field of Search .......................... 60/421, 428, 429, 60/430, 450; 91/31, 32, 33, 183, 446; 414/694, 912; 212/175, 349; 144/4.1, 24.12, 34.1, 34.5, 356, 382, 335, 336, 339

(56) References Cited

U.S. PATENT DOCUMENTS 2,598,233 A * 5/1952 Deardoff ..................... 60/421
3,590,760 A * 7/1971 Boyd .......................... 144/4.1
3,960,284 A * 6/1976 Carpenter ..................... 60/428
4,446,897 A * 5/1984 Kurelek ...................... 144/34.1
4,898,219 A * 2/1990 Pomies ..................... 144/24.13
5,107,912 A * 4/1992 Cote et al. ................ 144/24.13
5,170,825 A * 12/1992 Elliot ........................ 144/34.1
5,293,914 A * 3/1994 Hudson ................... 144/24.13
5,979,518 A * 11/1999 Hamby ....................... 144/34.1

OTHER PUBLICATIONS

Photocopy of sales literature entitled "EC–200 DELIMBER", by Tanguay, publication date unknown.

* cited by examiner

Primary Examiner—W. Donald Bray
(74) Attorney, Agent, or Firm—R. Craig Armstrong; Borden Ladner Gervais LLP

(57) ABSTRACT

The two boom members and hydraulic cylinders of a knuckle boom tree harvesting machine are so arranged and proportioned that with a single control movement during reaching and retracting actions the working tool head is made to travel in an approximately horizontal path. The cylinders and control valve are so connected that during horizontal reaching action load-supporting pressurized oil from a collapsing cylinder is not required to be dumped to the reservoir in the conventional heat generating manner, but is rather shunted directly to an extending cylinder where it continues to do useful load support work. Energy waste to hydraulic oil heat and fuel consumption is significantly reduced. Although these advances have been particularly developed for disc saw felling and stroke delimbing of trees they can also be applied to other knuckle boom applications where horizontal reaching is a major function.

4 Claims, 12 Drawing Sheets

HYDRAULIC CIRCUITS FOR TREE-HARVESTING KNUCKLE BOOMS

REFERENCE TO RELATED APPLICATION

This is a continuation of application Ser. No. 09/655,858, filed Sep. 6, 2000, and now U.S. Pat. No. 6,443,196 based on and claiming the benefit of provisional application no. 60/157,125, filed Oct. 4, 1999.

BACKGROUND OF THE INVENTION

1. Field of the Invention

This invention relates to achieving more energy-efficient horizontal movement of a tree-working tool being carried on the end of a two-member knuckle boom. The term "tree-working tool" throughout this specification is intended to encompass, for example, saw heads and other devices (such as shear heads, for example), for cutting trees at the stump; tree delimbing heads; tree processing heads; wood-handling grapples for piling or loading trees or logs; and other such tools in the tree-harvesting industry.

FIGS. 1A and 1B show an example of such a two-member knuckle boom, used in the tree harvesting industry for tree felling with a disc saw. It must often move a tree-harvesting implement in and out about 12 feet while not changing its height above the ground. It comprises a "hoist boom" having a proximal end pivoted to the machine base, and a "stick boom" having a proximal end pivoted to the distal end of the hoist boom. The disc saw is mounted on the distal end of the stick boom.

A particular concern in the tree harvesting industry, but in other industries as well, is the large amount of diesel fuel that is consumed when felling or delimbing or otherwise processing trees using tools carried by such knuckle booms.

Another concern in the industry is to improve the machine operator's ability to achieve near horizontal tool travel at a controlled velocity, as easily as possible. As noted in the present inventor's U.S. Pat. No. 5,794,674, it is a burden on saw designers to provide saws that are light enough for long reaches yet durable enough to withstand the often errant feed of two-lever manual control. This invention provides control of horizontal tool motion with a single control movement, such as forward and back movement of a hand lever.

2. Description of the Prior Art

Most logging machine reaching is done with knuckle booms that retain the energy-wasteful reaching characteristics of digging and load lifting machines, from which they were originally adapted. There is concern about the amount of hydraulic oil heat generated, and corresponding fuel consumed, that result when the tool, with or without a load, is moved horizontally with the knuckle boom, towards and away from the machine.

Some other prior art machinery uses sliding (or telescopic) booms to get energy-efficient linear movement and ease of operation on "reaching boom" applications, but these present major problems in design for reliability—for example in the hose runs to feed the implement being carried out on the end, and in providing wear surfaces or rollers and raceways to accommodate continuous sliding action in adverse conditions. U.S. Pat. No. 3,981,336 (Levesque) shows a felling and delimbing device that was intended to telescope horizontally. U.S. Pat. No. 4,276,918 (Sigouin) and U.S. Pat. No. 4,428,407 (Bourbeau) are examples of telescopic and horizontally sliding delimbers that have proven to be difficult to maintain.

Still others have chosen to ease operator requirements and reduce reach energy losses by designing their booms with built-in parallelograms, but the additional links, pins and levers needed to achieve the desired boom end coverage geometry add much to machine weight and promise poor reliability when used in adverse logging conditions. U.S. Pat. No. 5,170,825 (Elliot) shows one such linkage boom and describes well the recently evolving needs to support and move a disc saw felling head along a suitable path. Other earlier linkage type booms that had not anticipated disc saw felling and boom delimbing are represented by illustrations in U.S. Pat. No. 3,590,760 (Boyd). The present inventor's U.S. Pat. No. 4,446,897 is an example of side-cut (swing-cut) being substituted for a preferred but uncertain reach-cut.

On knuckle boom machines the diesel engine power used for horizontal reaching can be measured from determining the amount of hydraulic oil pumped and its pressure, and then adding a small amount for friction losses.

To help visualize the wastefulness of a prior art boom during a full reach action, it should be noted that when horizontal reach action is being achieved by simultaneously supplying oil to both the hoist and stick cylinders in the right proportions, the amount of oil needed and its pressures are nearly the same as if the load (boom members, tool and tree) was sequentially first fully lifted by one cylinder and then lowered by the other. For example, to extend a disc saw or other tool out horizontally, hydraulic oil being pumped from the reservoir at a working pressure is directed by a stick valve to the base of a stick cylinder while a hoist directional-control valve drains already pumped oil from the base end of the hoist cylinder to the reservoir. The stick valve also drains oil from the stick cylinder rod-end to the reservoir; and the hoist valve also sends pumped oil from the reservoir to the hoist cylinder rod end. In other words, on prior art knuckle boom machines, near-horizontal travel paths for the end point of a knuckle boom are now typically achieved by simultaneously feeding to and removing the correct amount of hydraulic oil from hydraulic cylinders. A definite amount of oil heat is generated, and is readily calculable by those knowledgeable in the field of the invention. When closely examined it can be seen that such oil flows are very inefficient and require installation of high horsepower diesel engines and large cooling systems, causing high fuel consumption.

SUMMARY OF THE INVENTION

It is an object of this invention to avoid excessive hydraulic oil heat generation and excessive fuel consumption during reaching in and out, and to do this without significantly changing the hydraulic pump and valve systems of the carrier machines, nor departing from the structural compactness of the prior art knuckle booms.

Another object of the preferred embodiment of the invention is to provide for easier operation and training, by allowing a beginner operator to achieve horizontal tool path travel using only one control motion, for example a back and forth hand control lever, resulting in a much shorter learning time than with the two levers of the prior art. The operator's other hand is thus freed for controlling the tilt of the tool.

In the invention, therefore, hydraulic line connections are arranged so that simultaneous supply and dumping of load-supporting pressurized oil during reaching is avoided, so that engine power is needed primarily for friction and flow losses.

This invention therefore shunts pressurized oil directly from the collapsing hoist cylinder base-end to the extending cylinder base-end, where it continues to do useful load support work and thereby avoids most of the problematic heat generation.

This invention separates out the load-carrying work from the reach positioning function of the knuckle boom and leaves that load-carrying work with the hoist and stick cylinders. A separate "reach" cylinder is introduced, which does not carry load but instead controls the reach action. Because in good knuckle boom designs the hoist and stick cylinders have always carried their loads at nearly equal pressures, although on separate circuits, it is possible to connect their base ends together with a hydraulic line so that a load-supporting pressurized volume or "slug" of oil can flow between them, while the reach cylinder alters the knuckle angle to get reach action. The reach cylinder also provides the make-up force which is needed to stabilize the knuckle boom, since the hoist and stick cylinders operate at exactly the same oil pressure.

Although in theory the reach cylinder needs to be only large enough to overcome all the frictions and to make up any mismatching between the hoist and stick cylinders, in practice it preferably is sized to be robust like the other cylinders, so that it is not easily damaged and so that it can be used to do push and pull work if desired. The oil that this cylinder receives from the pump and dumps to the reservoir is not as wasteful as the hoist and stick oil of the prior art. That is because its pressure for unloaded reach is not far from the theoretical zero, and when useful reach work is being done, such as pushing or pulling a saw head, that is where the energy goes, i.e. into external work done, not into oil heat.

Ideally, the cylinder sizing and pinning geometry can be designed so that the volume of hydraulic oil in the stick cylinder base, added to that in the hoist cylinder base, is approximately constant as the stick boom point moves on a horizontal path. When this is done, energy saving is maximized and a single-action control gives horizontal tool travel. A slight departure from this rule will not result in a failure of this invention, but will result in a corresponding slight reduction in energy savings, and will require some use of a second control action to get more exact horizontal tool travel, if needed.

BRIEF DESCRIPTION OF THE DRAWINGS

The invention will now be described with reference to the accompanying drawings of the preferred and alternative embodiments, by way of example only. In the drawings:

FIG. 1A shows the knuckle boom retracted, and FIG. 1B shows it extended.

DETAILED DESCRIPTION

Figure 1A:
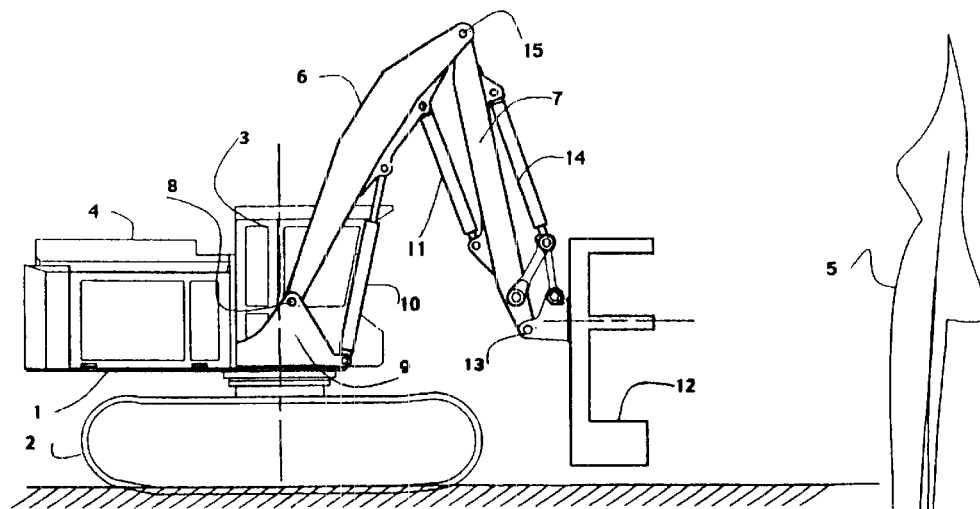
FIGS. 1A and 1B (both prior art) are side elevation views showing how prior art knuckle boom geometry is typically arranged and how the cylinders must alternately contract and extend to achieve tucking-in to reaching-out action.
Figure 1B:
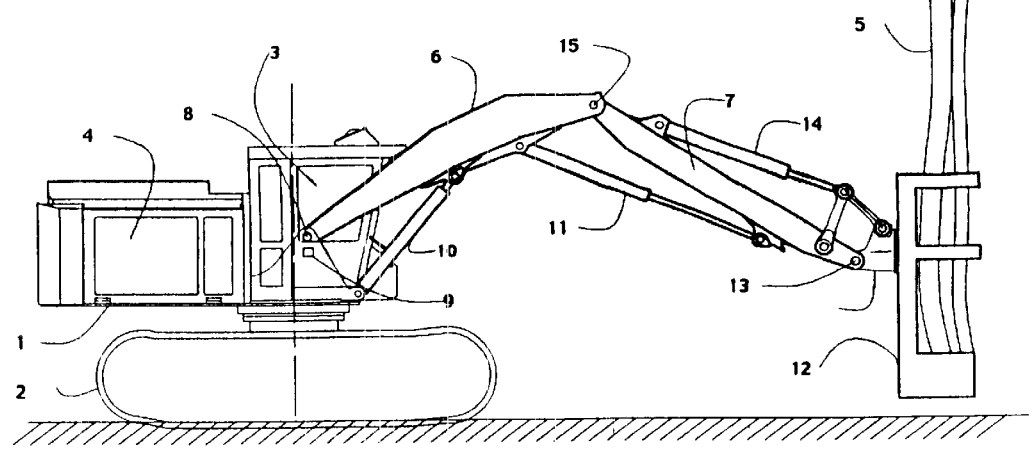

FIG. 1A shows a typical prior art configuration of a feller buncher for tree harvesting, in a retracted or "close reach" position. FIG. 1B shows it in an extended or "far reach" position. There is a machine base 1 supported above vehicle tracks 2. An operator's cab 3 is mounted on the machine base, and a diesel engine 4 is cantilevered on the back of the machine base. The knuckle boom assembly comprises a hoist boom 6, and a stick boom 7. The hoist boom is pivotally mounted relative to the machine base, for example at a hoist-base pivot pin 8 on a mounting bracket 9 secured to the machine base. The stick boom is pivotally connected to the distal end of the hoist boom at a hoist-stick pivot pin 15. The hoist boom is actuated by at least one hydraulic hoist cylinder 10 connected between the machine base and the hoist boom, at an effective angle relative to the hoist boom. The stick boom is actuated by at least one stick cylinder 11 connected between the hoist boom and the stick boom, at an effective angle relative to the stick boom. A tool, such as a feller-buncher head 12 (not shown in detail), is carried at the distal end of the stick boom. Commonly, the tool must also be kept level, and is therefore pivotally mounted about a horizontal axis at a tool-stick pivot pin 13 at the distal end of the stick boom. A tilt cylinder 14 is connected between the stick boom and the tool to control the angle of the tool relative to the stick boom. In FIGS. 1A and 1B, the tilt cylinder is shown pinned above the boom stick and acting on the head through a crank and link set (to achieve a larger tilt angle range). It is not significant to the invention whether such a crank linkage is used or not, or whether the cylinder is above the stick boom, or below it as shown for example in FIG. 3A.

The invention generally has or can have the same components as in the prior art, but also has an additional hydraulic cylinder and different connection lines. It is helpful to compare the circuit drawings for the invention with typical prior art circuit drawings, to understand the differences in the hydraulic conduit connections which cause the improvement in operation.

Figure 2:
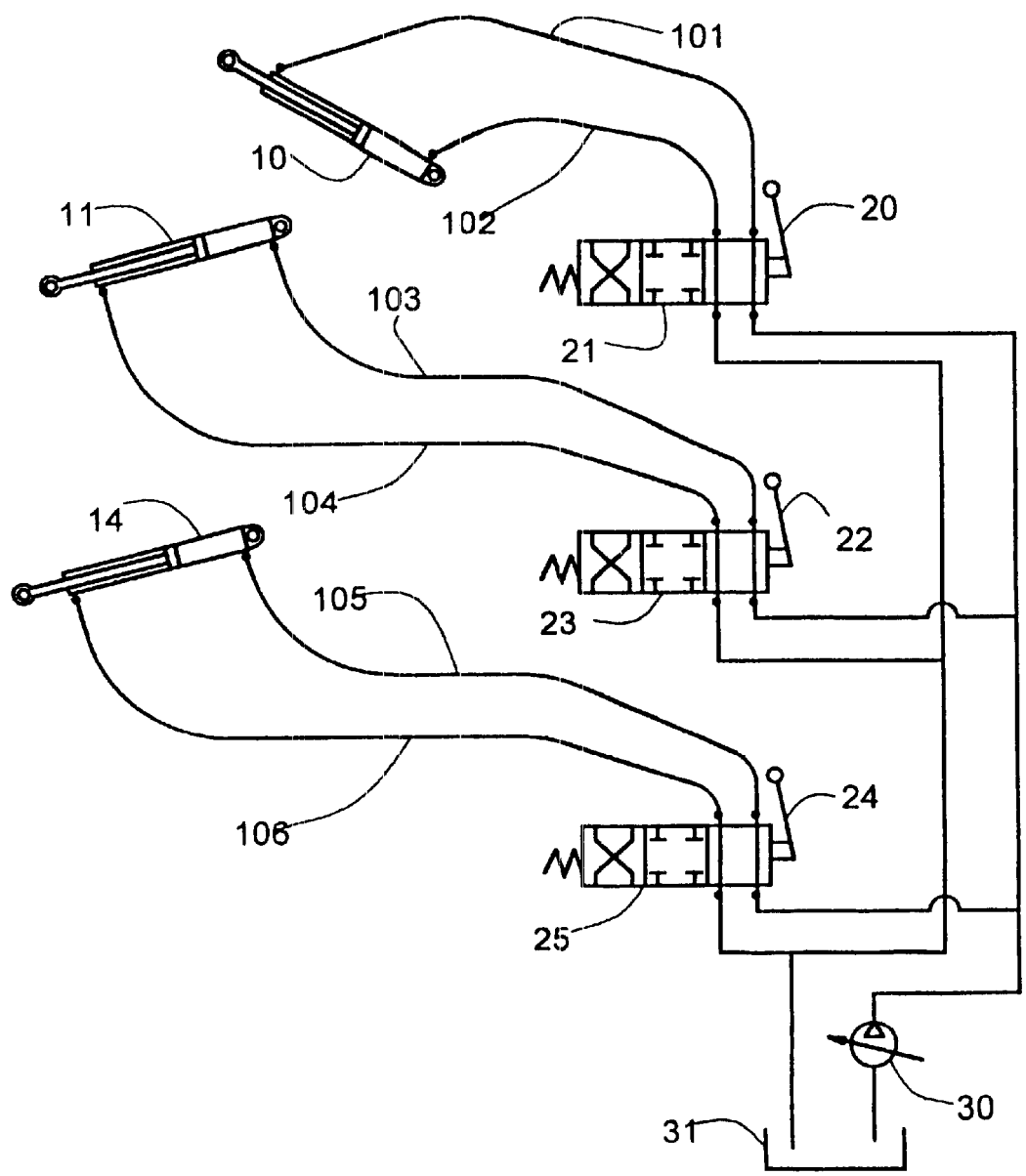
FIG. 2 (prior art) is a schematic diagram of typical prior art oil flow conduit connections between the major components.

FIGS. 1A and 1B show how knuckle boom geometry is typically arranged in the prior art, and how the cylinders must alternately contract and extend to achieve reaching and tucking action. FIG. 2 is a schematic diagram of typical oil flow connections in the prior art. Each of the three cylinders has its two ports connected individually by separate hydraulic conduits to the two work ports on respective directional control valves. Thus the hoist cylinder 10 is operated by a hoist control lever 20 through a hoist directional control valve 21. The hydraulic conduit line 101 connects one of the work ports on valve 21 to the rod end port of the hoist cylinder, and conduit 102 connects the other work port of valve 21 to the base end port of the hoist cylinder 10.

Similarly, the stick cylinder 11 is operated by a stick control 22 through a stick directional control valve 23 and conduit lines 103 and 104. Finally, the tilt cylinder 14 is operated by a tilt control 24 through a tilt directional control valve 25 and conduit lines 105 and 106.

Thus each control and valve operates its own cylinder and no other. Since all three cylinders must operate simultaneously and at the appropriate matching speeds to get horizontal tool head movement while keeping the tool vertical, considerable training and skill are required for an operator to be highly productive; the operator must learn to control three movements simultaneously.

These drawings of the prior art assist in visualizing that throughout the horizontal travel of the tool the base ends of both the stick and the boom cylinders remain pressurized. The weight of the hoist boom 6, stick boom 7, head 12 and tree 5 all are supported against pivoting about the hoist-base pivot pin 8 by the hoist cylinder 10 acting as a strut, with oil in its base end and conduit 102 being under pressure. The oil in the base end of the stick cylinder 11 and in conduit 103 is similarly pressurized by the weights of the stick boom 7, the head 12 and the tree 5. Laws of trigonometry for efficient design and full use of components cause these two base end pressures on most machines manufactured, even in the prior art, to be nearly equal to each other for most of the distance of horizontal tool travel, even though they are never connected together. When a directional valve is manually activated to extend one of these cylinders the pump supplies pressurized oil to the base, while the rod end oil is dumped to the hydraulic oil reservoir. When the valve is used to retract a cylinder, the base end oil is dumped to the reservoir while pumped oil is used to fill the rod end.

Figure 3A:
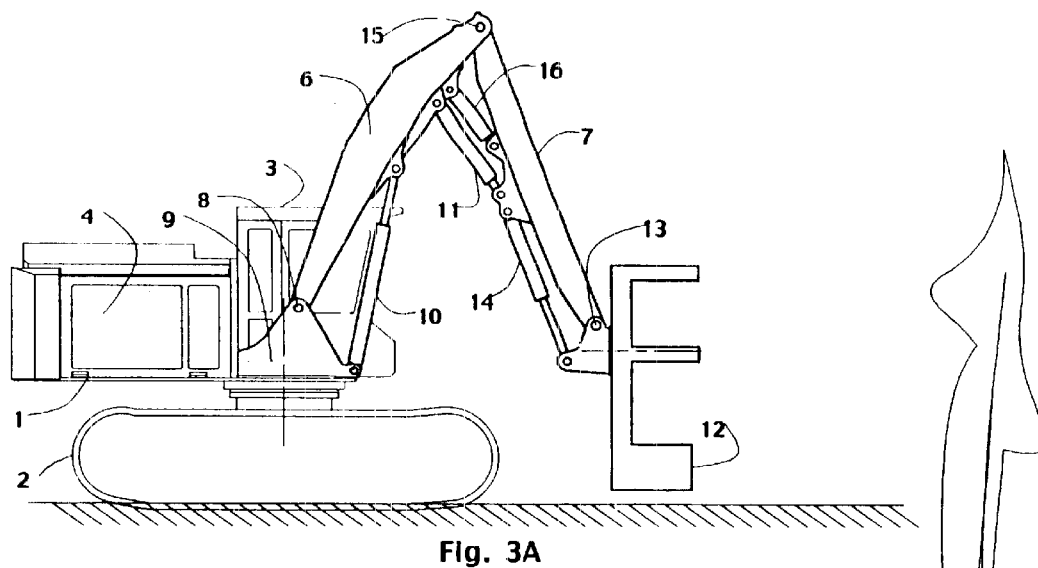
FIGS. 3A and 3B are side elevation views of the preferred embodiment of the invention, similar to prior art FIGS. 1A and 1B, showing a preferred location where the "reach" cylinder of this invention can be pinned into the knuckle boom geometry, and showing how the cylinders extend and contract between retracted and extended boom positions.
Figure 3B:
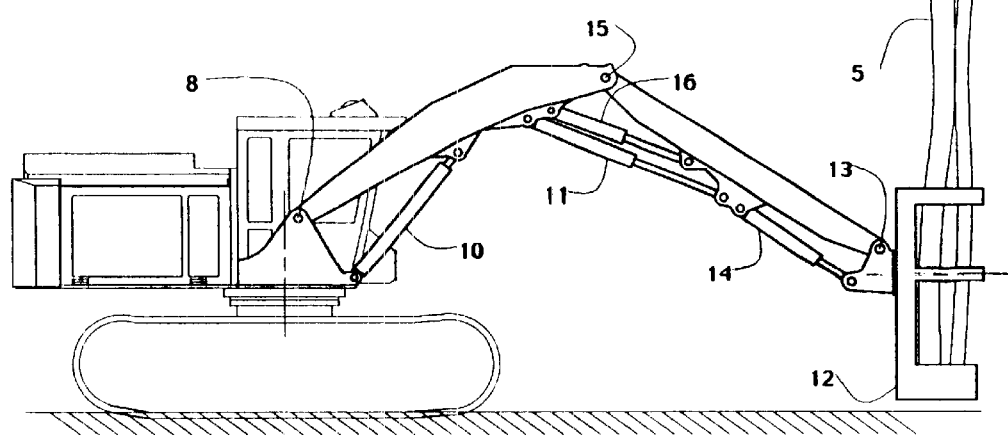
Figure 4:
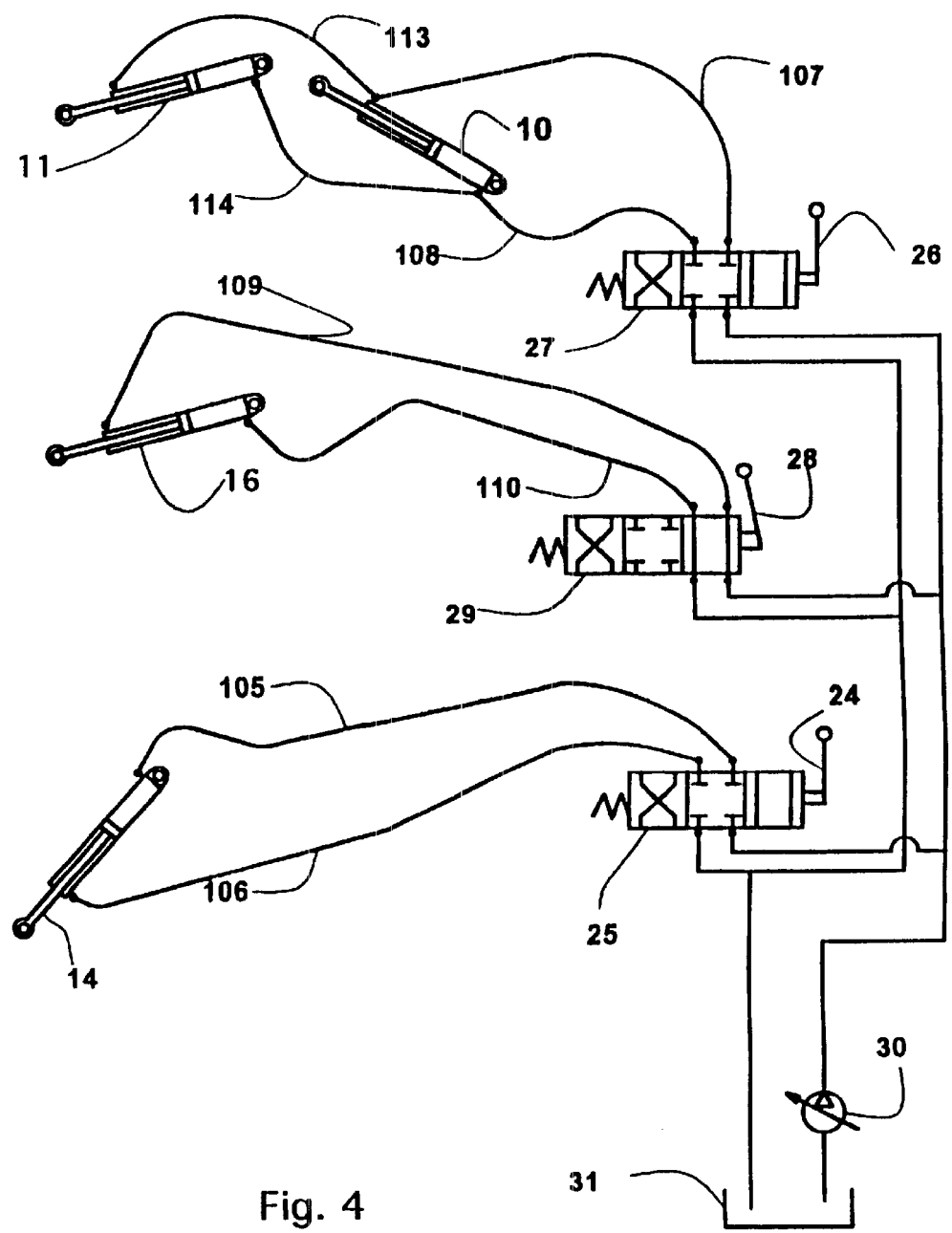
FIG. 4 is a schematic diagram of oil flow conduit connections between the major components of the preferred embodiment of the invention.
Figure 5:
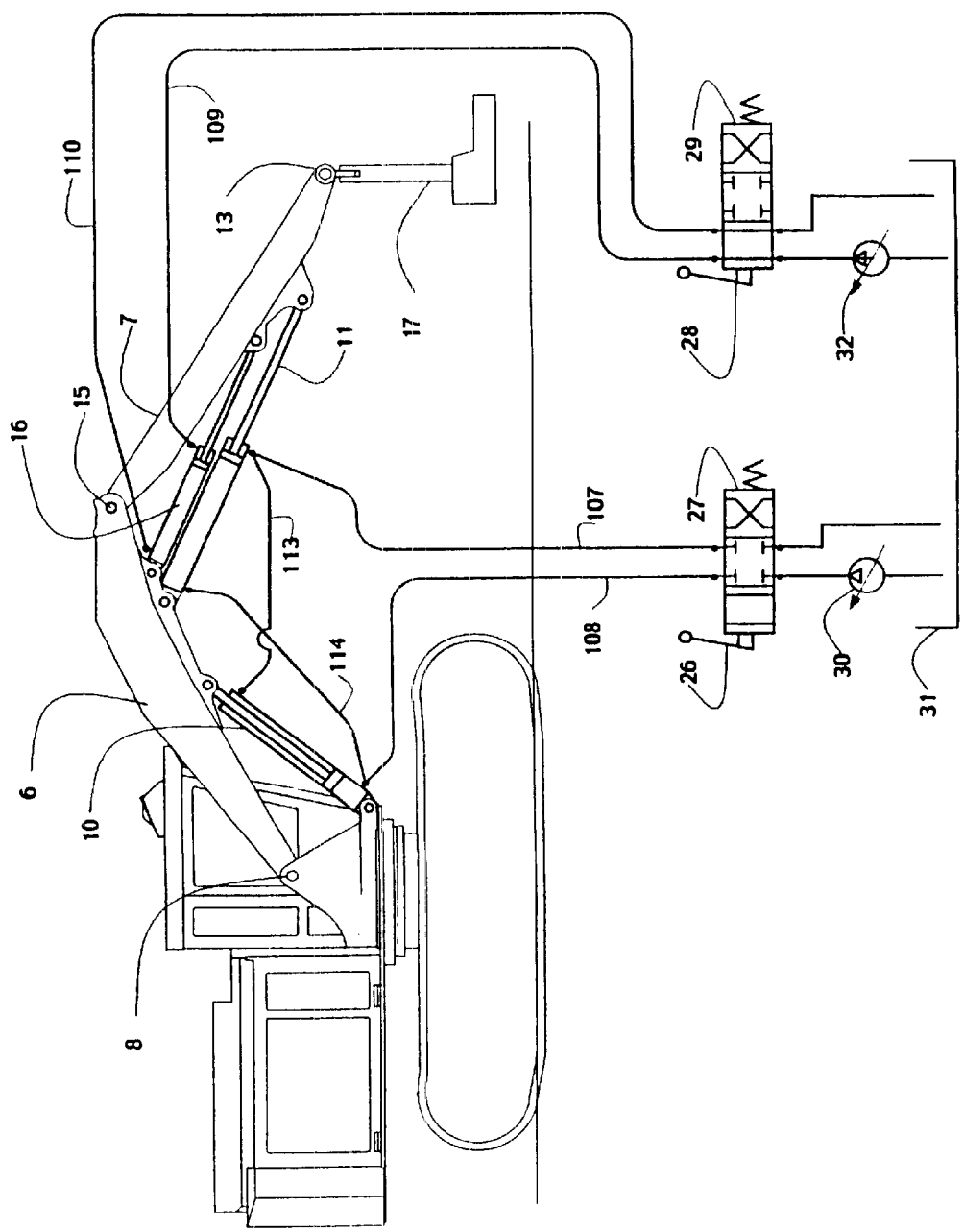
FIG. 5 is a side elevation view showing a simple use of the invention, in which there is no power tilt for the tool or head. The hydraulic components and the essential conduit lines that connect them are shown schematically.

In the invention, as shown in FIGS. 3A and 3B, the hoist cylinder 10 and the stick cylinder 11 remain pinned into the knuckle boom much as in the prior art, but the hydraulic conduit connections are changed as can be seen in FIGS. 4 and 5. An additional cylinder, called a "reach" cylinder 16, is pinned into the knuckle boom geometry, between the hoist boom and the stick boom, to alter and hold the angle between them. The tilt cylinder 14 and its circuit in this preferred embodiment are unchanged from the prior art in FIG. 2.

FIG. 4 is a simplified schematic showing how the hydraulic connections are made to reduce reach energy consumption. Although the bank of valves need not be physically changed, the hoist valve 21 of the prior art becomes the "lift" valve 27 of the invention. The stick valve 23 becomes the reach valve 29. The tilt valve 25 and the hoist, stick and tilt cylinders 10, 11 and 14 remain substantially unchanged. Conduits 107 and 108 (corresponding to conduits 101 and 102 of FIG. 2) still connect the ports of the hoist cylinder 10 to the work ports of valve 21. However, the stick cylinder 11 is not connected at all to valve 29 (corresponding to valve 23 in FIG. 2), but instead is connected by means of conduit 114 to conduit 108, which in effect unites the base end volume of the hoist cylinder 10 with the base end volume of the stick cylinder 11. That is, the hoist cylinder and stick cylinder base ends are piped together and to a valve work port with hydraulic conduit, so that they share a common load-supporting pressurized volume or "slug" of oil behind their pistons. With a routine calculation in selecting appropriate rod and piston diameter sizes, as is known in the art, conduits 107 and 113 can be used to similarly provide a hydraulic connection to the rod end ports of the hoist cylinder 10 and stick cylinder 11. Alternatively, the rod end ports can be connected for connection via a valve to either the reservoir or the supply, i.e in the preferred embodiment they are connected together as is the case with the base ends, but that is not essential, and some significant benefit from the invention can be achieved without such a connection; it is the load-supporting hydraulic oil, i.e. the oil in the base ends of the hoist and stick cylinders, which is more important. Even though during normal operations no load is supported by the rod-end oil and it might expediently be connected to the reservoir 31, it is preferred to be able to pressurize it so that the boom is also usable for pushing down with its tool end in certain operating and maintenance situations.

Thus the lift valve 27 merely controls the volume of the hydraulic oil slug which is free to shuttle between the base ends of the hoist and stick cylinders (and between the rod ends of those cylinders, if connected so that this is applicable to them as well). Examining this situation, one can see that, ignoring friction, there is nothing in this hoist and stick cylinder arrangement which prevents free in and out reaching motion of the knuckle boom. All that happens as the boom is retracted or extended is that the slug of oil flows back and forth freely between the respective cylinders. Thus as the boom extends from the position of FIG. 3A to the position of FIG. 3B, hydraulic oil leaves the base end of the hoist boom so that it retracts, and shuttles to the base end of the stick boom so that it extends. At the same time, of course, hydraulic oil leaves the rod end of the stick boom, and shuttles to the rod end of the hoist boom.

Of course, this free reaching of the boom cannot be allowed, so this is where the "reach" cylinder 16 comes into play. By means of a directional valve 29 the reach cylinder 16 is used to adjust and set the stick-to-hoist boom angle, and thus control the reach. The reach cylinder does not primarily support the loads, as that is accomplished by the slug in the hoist and stick cylinders; the reach cylinder only alters the angle between the stick boom and the hoist boom.

As mentioned above, the tilt mechanism of the prior art can be retained, as in the preferred embodiment, and indeed normally would be retained. However, FIG. 5 is a schematic representation showing the components and hydraulic connections of the simplest embodiment of the invention, in which there is no tilt control, which may be acceptable for some applications of the invention. FIG. 5 illustrates how both the stick and hoist cylinders are made to stroke simultaneously with one control movement, i.e. operation of control lever 26.

When both valves 27 and 29 are in their center positions (as valve 27 is drawn), the pumps supply no oil to the cylinders, nor can any oil escape from the cylinders to the reservoir 31. The weights of the tool 17, the hoist boom 6, stick boom 7, stick cylinder 11 and reach cylinder 16 all tend to pivot the entire boom assembly down around hoist-base pivot pin 8. The hoist cylinder 10 resists this rotation with a force from oil pressure in its base end sufficient to match the loading moments.

At hoist-stick pivot pin 15 only the stick boom 7 and the tool 17 cause a loading moment and force, which must be shared by the stick cylinder and the reach cylinder. How this loading is shared by these two cylinders is an important part of this invention.

Because conduit 114 connects the base end ports of the hoist cylinder 10 and the stick cylinder 11, the pressure provided by the hoist cylinder 10 to the base of the stick cylinder 11 is whatever is needed for the hoist cylinder 10 to support the entire boom, as just described. This hoist pressure acting in the stick cylinder 11 provides a moment about hoist-stick pivot pin 15, which opposes the downward moment of weights of the stick boom 7 and tool 17. If this stick cylinder moment is less than the loading, then reach cylinder 16 (being locked with trapped hydraulic oil) develops enough base end pressure to produce a force that makes up the moment difference so that the stick and its tool do not pivot down. If the stick cylinder moment with its hoist-dictated pressure is more than needed at the hoist-stick pivot pin 15 to hold up the stick boom and the tool, then the reach cylinder will develop a rod end pressure to resist the excess.

To gain the energy-saving benefits of the invention, those implementing the invention will select the cylinder sizes and their acting geometry, using ordinary knowledge in the industry, so that when the system is operated by stroking the reach cylinder, the pressure that the hoist cylinder sends to the stick cylinder is right for it to support the moments about the stick pivot, with little assistance from the reach cylinder for much of the reach range. The volume of oil flowing from the stick cylinder to the hoist cylinder (when retracting reach) remains pressurized so that the loads can be supported in a new reach position without having dumped nor added pumped oil. In the prior art of FIGS. 1A and 1B, by contrast, stick cylinder 11 oil is dumped to the reservoir and new oil is pumped to extend hoist cylinder 10.

If the cylinder sizes and geometry are calculated such that the reach cylinder exerts a significant amount of force to assist the stick cylinder or to hold it back, and the boom point travel is not nearly horizontal with single control lever action, then the energy saving will be somewhat reduced. This should not be considered a failure of the invention because some knuckle boom applications might be preferred to work that way, accepting the energy saving still obtained by exchanging at least some of the working oil by means of conduit 114 instead of dumping and pumping all of the oil.

To achieve maximum energy savings during reaching it is necessary to lay out the boom geometry and cylinder strokes and diameters so that the volume of oil in the base end of the hoist cylinder plus the volume in the base of the stick cylinder plus the volume in conduits 108 and 114 remains nearly constant as the felling head is moved, for example from the position in FIG. 3A to that in FIG. 3B. Since existing wood harvesting knuckle booms are usually already designed to do equal amounts of work with their sticks and hoists, this can easily be done by those skilled in the art.

Preferably, as shown in FIGS. 4 and 5, the rod ends of the stick and hoist cylinders are also connected directly together by means of conduit 113 and also to the other work port of valve 27 by means of conduit 107. During reaching action another, smaller slug of oil will be shunted between the rod ends of those cylinders. As stated previously, even though during normal operations no load is supported by the rod-end oil, it is preferred to be able to pressurize it so that the boom is also usable for pushing down with its tool end in certain operating and maintenance situations.

Figure 6:
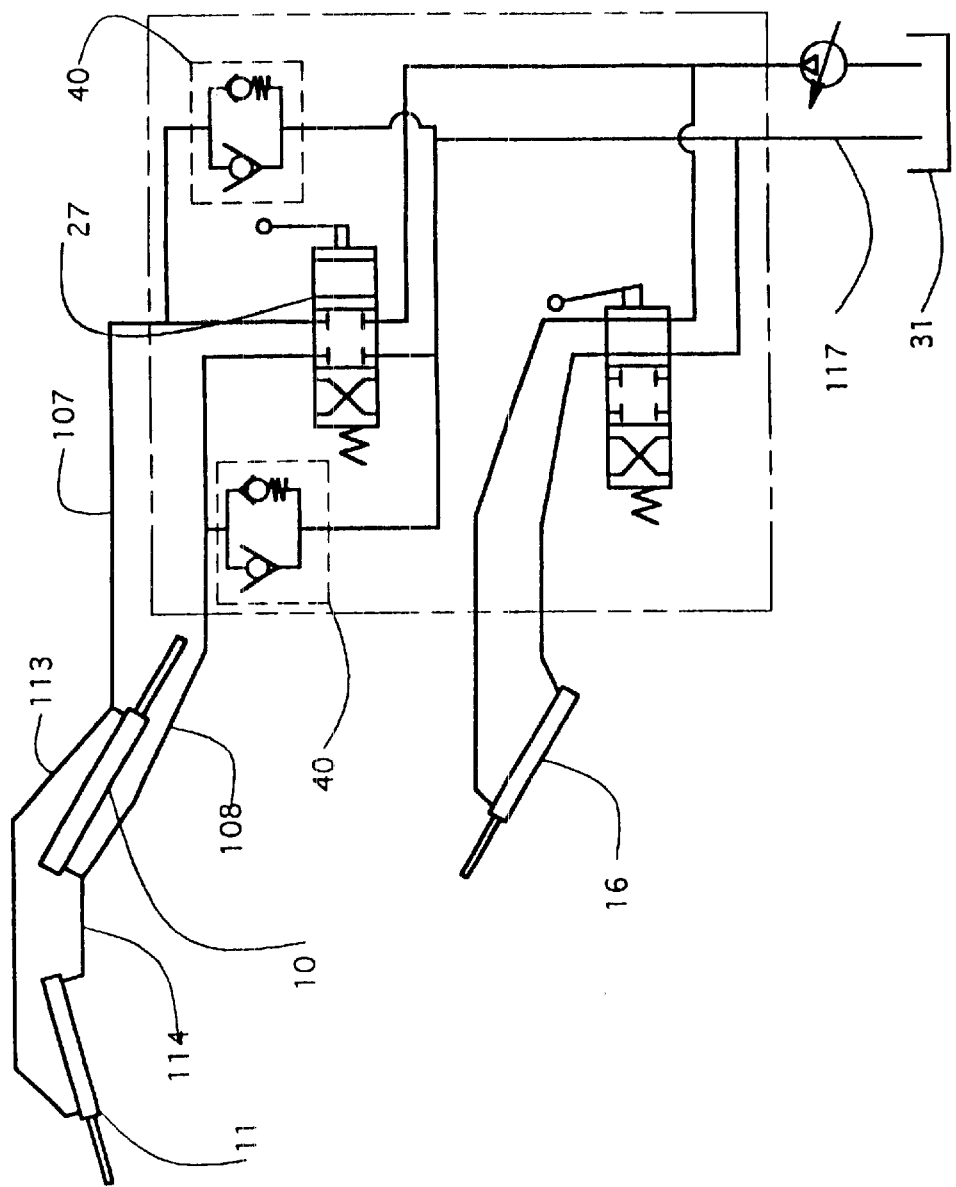
FIG. 6 is a hydraulic circuit option for the machine in FIG. 5.

In order to use this preferred rod-end connection arrangement those skilled in the art will calculate to ensure that the ratio of the piston rod diameter to the piston diameter is the same in both the hoist and stick cylinders. This will prevent unwanted oil pressure build up and cavitation in the rod-ends when the work ports in valve 27 are closed and the stick cylinder is being stroked by the reach cylinder. FIG. 6 illustrates that even if the ratio calculations are not made exact, the anti-cavitation and port-relief device 40, found in most commercial directional valves, will prevent damage. Of course any oil forced out to the reservoir 31 via conduit 117 will be an unwanted heat generation so it is preferred to calculate and manufacture the diameter ratios to be very nearly equal.

As can be best visualized from FIG. 5, when it is necessary to depart from horizontal boom point travel and for example only raise the tool, the reach control 28 and its valve 29 are left in the neutral position so that reach cylinder 16 is prevented from stroking. Control lever 26 is then used to operate directional valve 27. This valve sends additional pumped oil via conduit 108 to join the slug of oil which occupies conduit 114 and the base ends of both the hoist and stick cylinders. Since the stick cylinder is prevented from stroking by the locked reach cylinder, this additional oil enters the hoist cylinder base, extends its stroke and raises the boom. Similarly, removing oil from the hoist cylinder base with valve 27 can lower the tool. During actual working use some amount of reach is usually mixed with raising and lowering, i.e. a good approximation of perfect horizontal reach is the most that is likely to be obtained in practice. At such times both valves 27 and 29 are simultaneously activated to compensate for any minor deviations from the horizontal, if they cannot be tolerated, but the operator still has a distinct control of reaching with a single hand action.

The preceding paragraph describes lifting the tool if the reach cylinder is pinned in the stick location. This is the preferred arrangement because a desirable lifting arc is obtained about the hoist-base pivot pin 8. If as shown for example in FIG. 8A the reach cylinder 16 is in the hoist location, the lifting action pivoting will be about the hoist-stick pivot pin 15, which is not a good arc.

Some additional improvements and variations are described in the following:

FIG. 5 illustrates the simple case where the tool head attitude does not need to be held, as for example when a loader grapple or harvesting head is allowed to dangle or a tool gets its alignment by grasping a tree stem. Although a tilt control valve and cylinder are not needed, the invention can be advantageously applied to such felling, harvesting, delimbing and loading knuckle booms.

Figure 7:
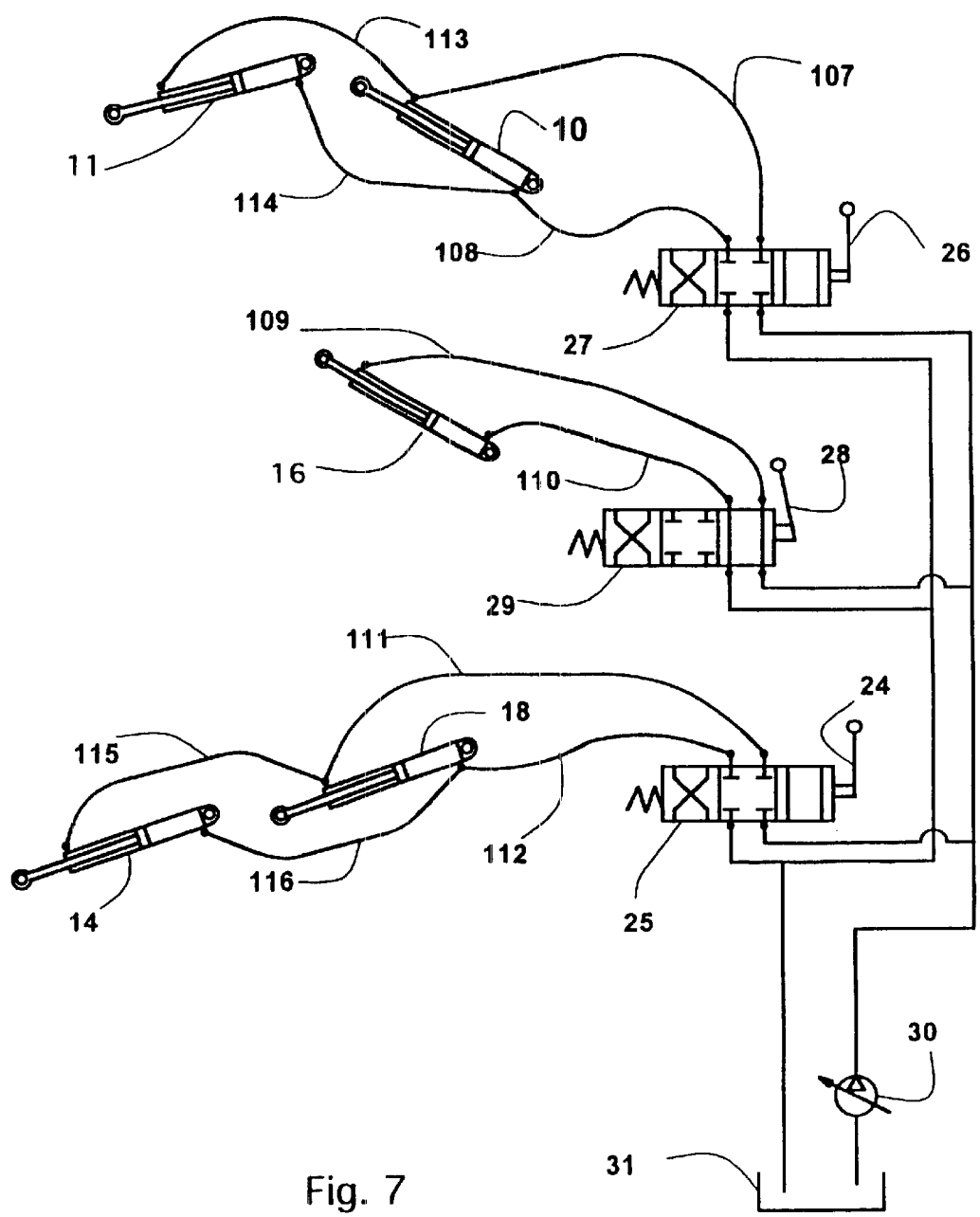
FIG. 7 is a simplified circuit diagram for a machine where automatic tool attitude is provided.
Figure 8A:
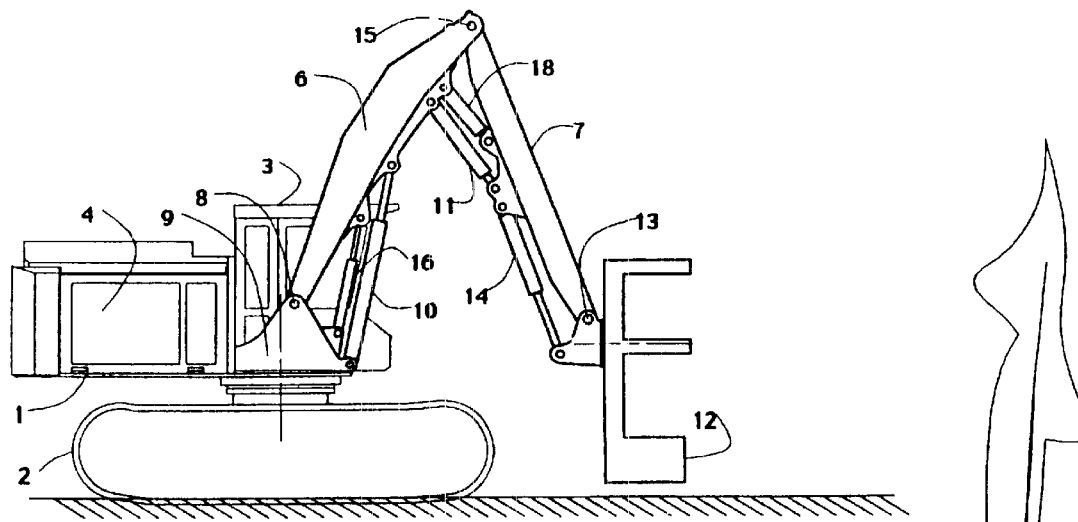
FIGS. 8A and 8B are side elevation views showing some of the possible reach and sender cylinder locations when automatic tilt is provided.
Figure 8B:
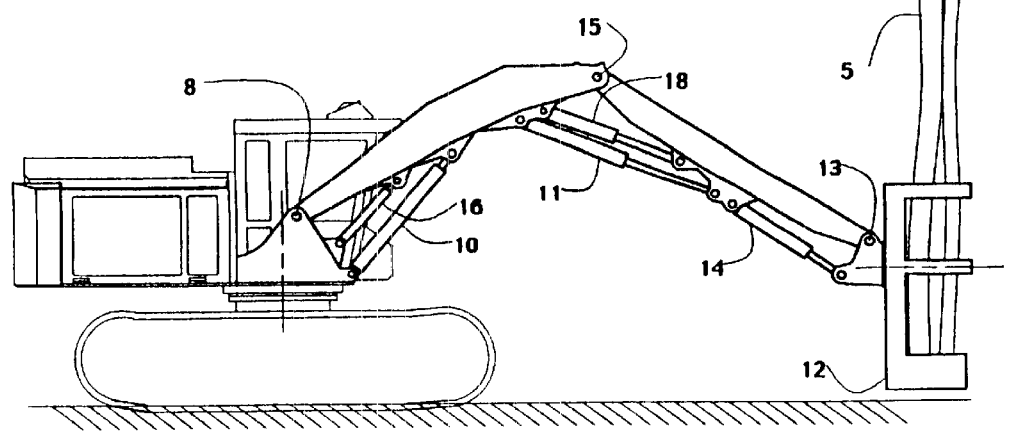

In most uses involving tools carried by knuckle booms, providing one-hand reach control is a very significant improvement. The operator's other hand, being freed from the task of helping to effect horizontal reach, can do a good job of adjusting the tilt attitude of the head as needed for delimbing or tree felling. This is the situation shown in FIGS. 3A, 3B and 4. However, in some cases where the tool is especially fragile or the feed attitude critical, it may be desirable to set up the circuit as shown in FIG. 7, where a "sender" cylinder 18 exchanges a slug of oil with the tilt cylinder 14, thus providing a certain degree of automatic tilt control. Cylinder diameters and strokes can be calculated by those skilled in the art so that the tool has the desired tilt angle while the invention moves it on a desired locus. FIGS. 8A and 8B show one possible cylinder extension sequence and location arrangement for such a hydraulic circuit. Because the tilt and sender cylinders 14 and 18 do useful work without needing or dumping pumped oil, this action saves energy as compared to the prior art, but it is necessary that the cylinders both have their same ends pressurized when supporting the tool.

Another variation is useful in some work situations where a knuckle boom machine may be required, for example, to do mostly high piling of wood for periods of time where not much reaching is needed, and then at times turn to delimbing where much reaching is done. Optional selector valves 51 and 53 as shown schematically in FIG. 9 may be inserted into the hydraulic circuit, allowing the operator to switch back and forth between what is essentially a prior art configuration, and the configuration of the present invention as the work changes. Specific connections resulting from operation of the valves are not shown, since such connections would be clearly within the level of ordinary skill in the art, but essentially the result is switching between FIG. 2 type of prior art routing, and the routing of the invention. The valves could be ganged together, or preferably they could be kept separate to allow operators to select any one of four modes: tilt and reach on, tilt and reach off, tilt off-reach on, or tilt on-reach off. It is also known that with more complicated controls than depicted by the manual levers 50 and 52, or even with electronic programming, the selector switchover could be automatic within a cycle. However for the rough machine usage conditions in tree harvesting, it is best to obtain the substantial fuel savings and improved tool control of this invention without adding additional technical complexity. Knuckle boom machines set up with a sophisticated capability to shift into or out of the efficient reach mode when needed for certain types of work would require this aspect of the invention.

It should be noted that while FIGS. 3A, 3B, 5, 8A and 8B show the reach cylinder 16 pinned to the hoist boom and to the stick boom just above the stick cylinder II as a way to achieve balanced bearing forces at the pin 15, it is sometimes more practical to pin these two cylinders side by side on exactly the same geometry, and design the bearings to be adequate for the resulting forces as one cylinder pushes with a different force than the other. The schematic drawings in FIGS. 4, 5 and 9, for example, apply for either reach cylinder pinning arrangement.

Figure 10:
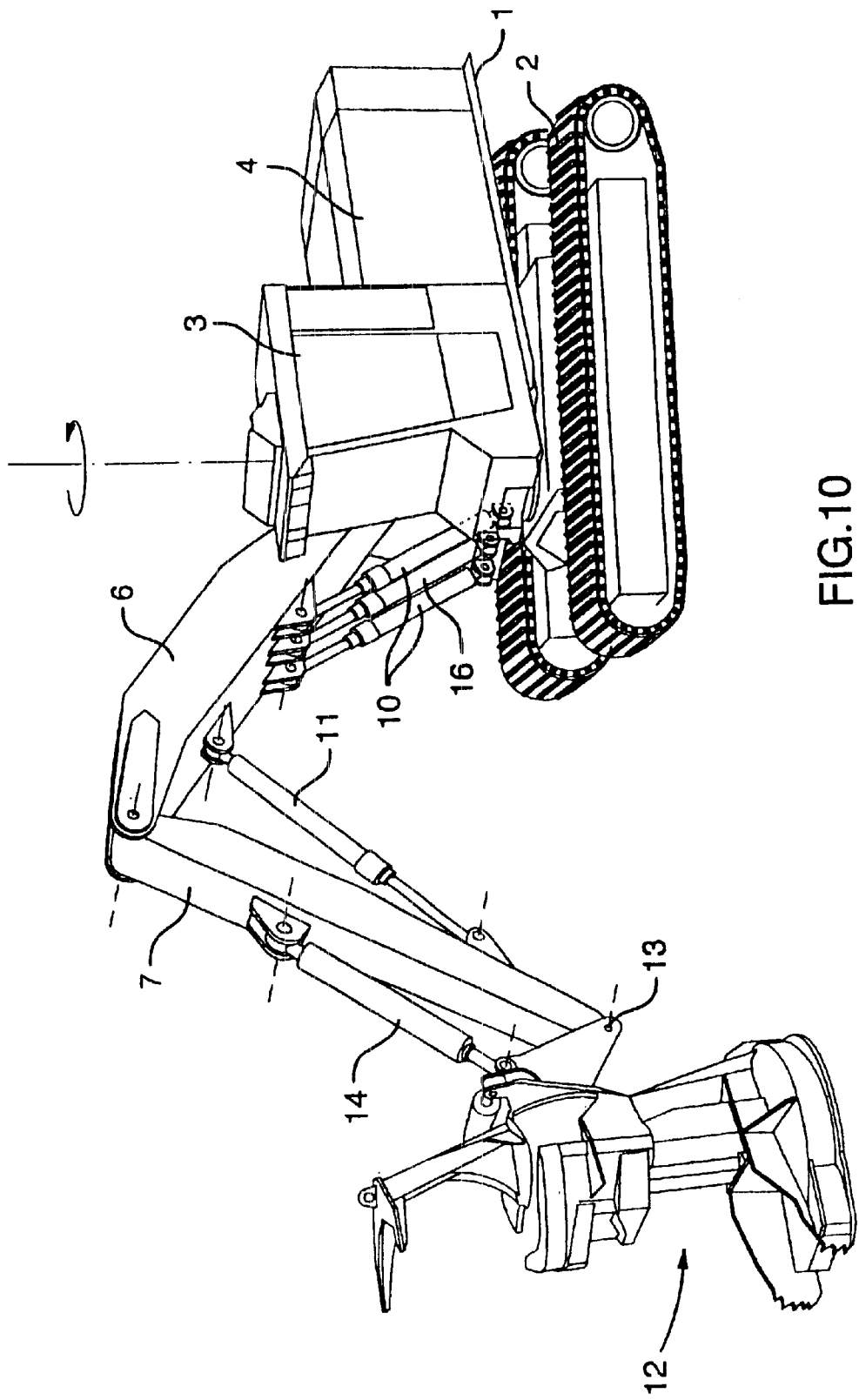
FIG. 10 is a perspective view showing that the reach cylinder (or a sender cylinder) can be pinned side by side with other cylinders. In this case it is shown between two hoist cylinders which are hydraulically connected together to act as one.

FIG. 10 illustrates another possible variation in which twin hoist cylinders are pinned side by side and the reach cylinder (or a sender cylinder) is in between them, which is also good for balancing pin bearing loads. When the reach cylinder is designed into the hoist location rather than the stick location, the schematic drawings of the hydraulic connections remain the same and the same energy benefits are obtained during horizontal action, so it clearly is part of the invention. However, this is not a preferred design because when only lifting of the tool is desired, operating the lifting valve only produces stick action and not boom and stick lifting.

Figure 9:
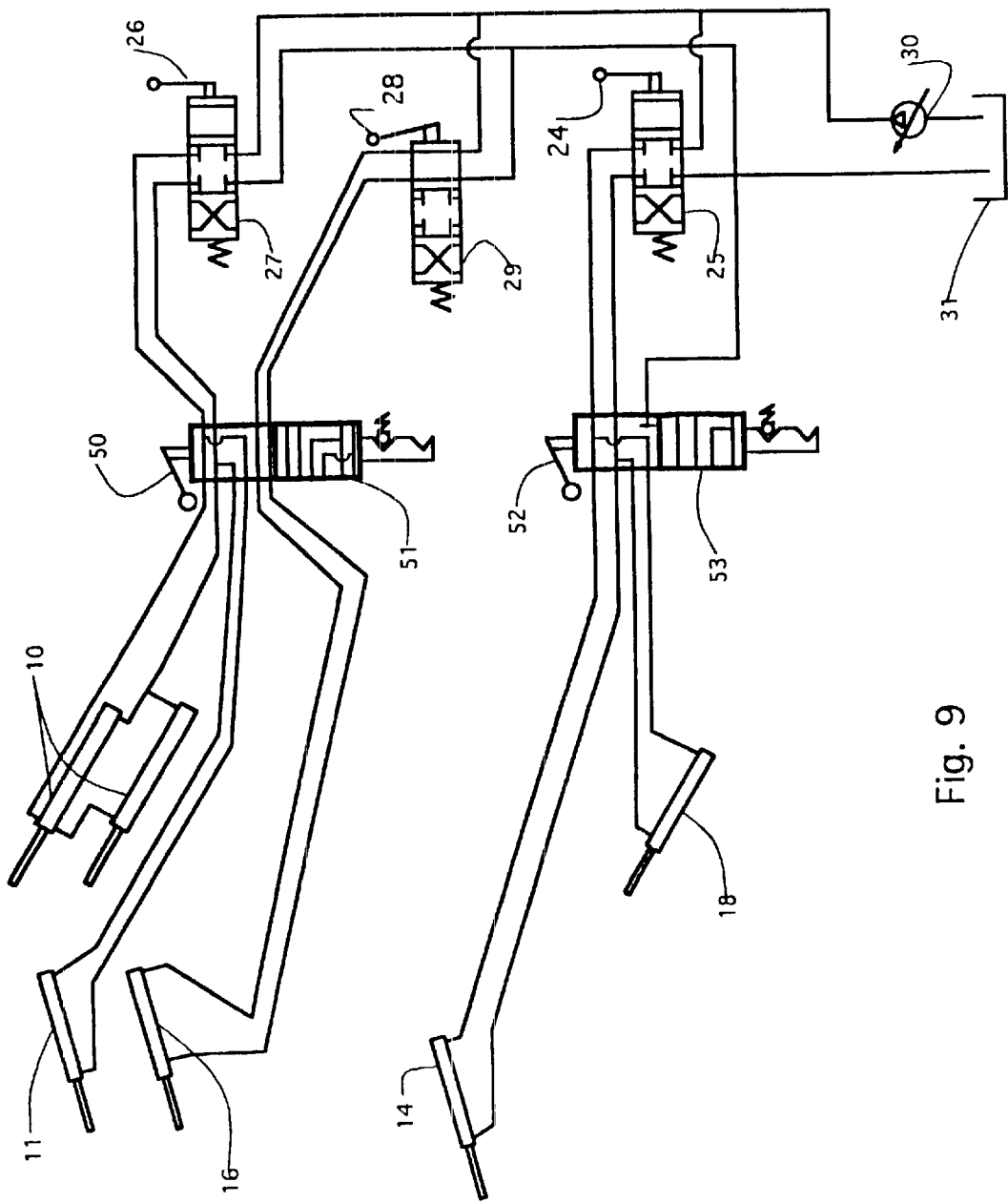
FIG. 9 is a schematic diagram showing how by means of selector valves a knuckle boom could be made to selectively operate either in the conventional prior art mode or in the mode of the invention.

When twin cylinders 10 are used instead of a single cylinder they are treated as a single cylinder in this invention and the schematic of their connections is as in FIG. 9. In this schematic the reach cylinder 16 is in the stick location and a sender cylinder 18 is in the hoist location between the twin hoist cylinders. For automatic tilt in this configuration, it should be appreciated that the tilt cylinder 14 must be above the stick boom as in FIG. 10, rather than below it, so that the sender and tilt cylinders counteract each other rather than add to each other.

Figure 11:
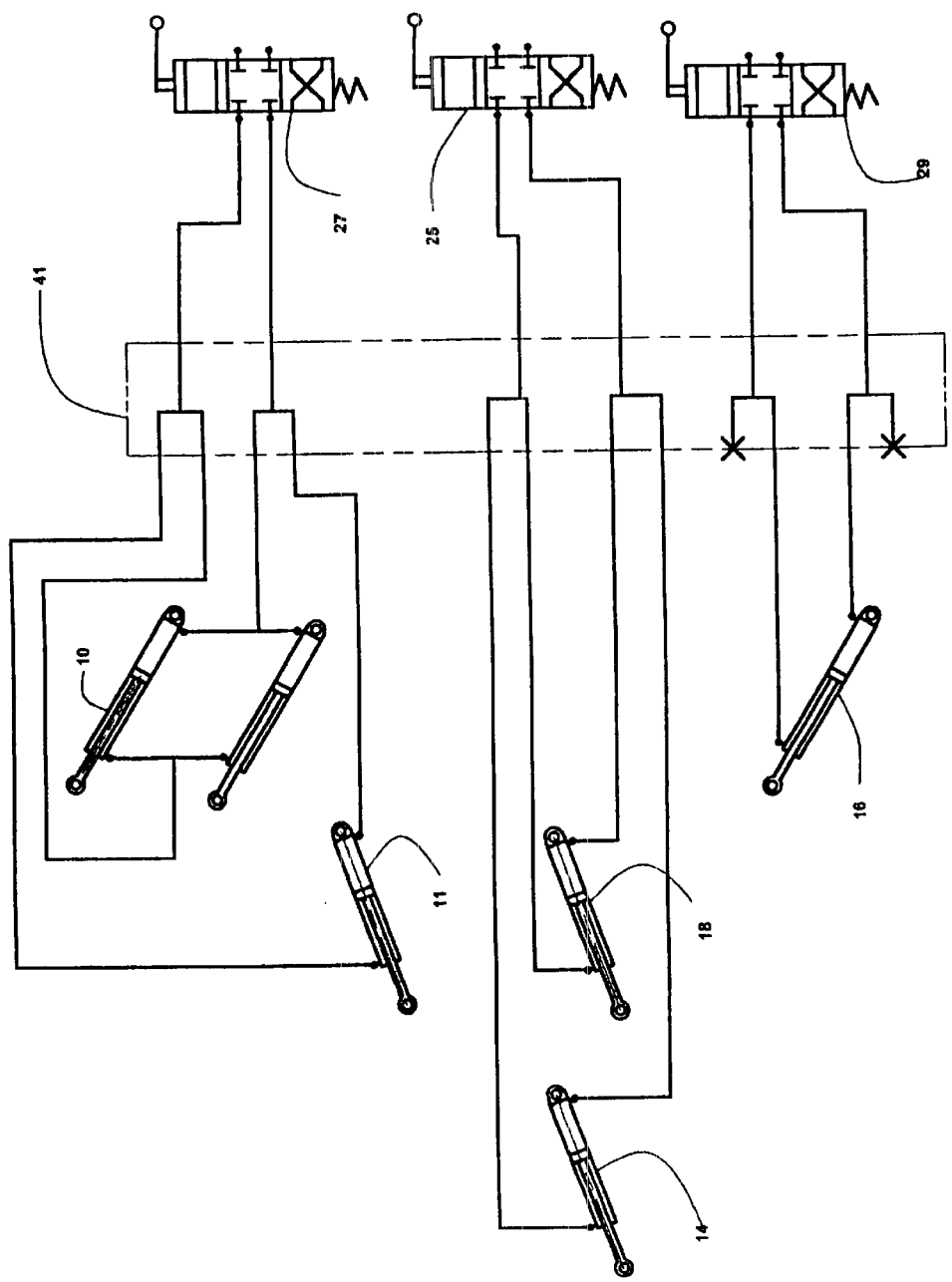
FIG. 11 is a schematic diagram showing hydraulic connections using a manifold block instead of tees.

FIGS. 2, 4, 5 and 7 show hydraulic conduit lines between the ports of components as single piece runs. For example, conduit 107 is shown from one of the hoist valve ports to the hoist cylinder rod end, where there is a tee for a hydraulic connection to both the cylinder and conduit (hose) 113. In practice the hose runs may not be that simple—the tee effect may not be at the cylinder but within the selector valve of FIG. 9 or in the manifold block of FIG. 11. It should therefore be appreciated that the illustrations are schematic only, and the practical implementation may vary from case to case, as will be clearly understood by those who are knowledgeable in the field of the invention.

FIG. 6 shows two hydraulic pumps, 30 and 32, instead of a single pump as in the other schematics. It is known that more pumps, even as many as one for each cylinder, will theoretically reduce energy waste. But in practice these particular machine functions are most often done with only one pump to simplify the mechanical drives and hydraulic conduits.

Figure 12:
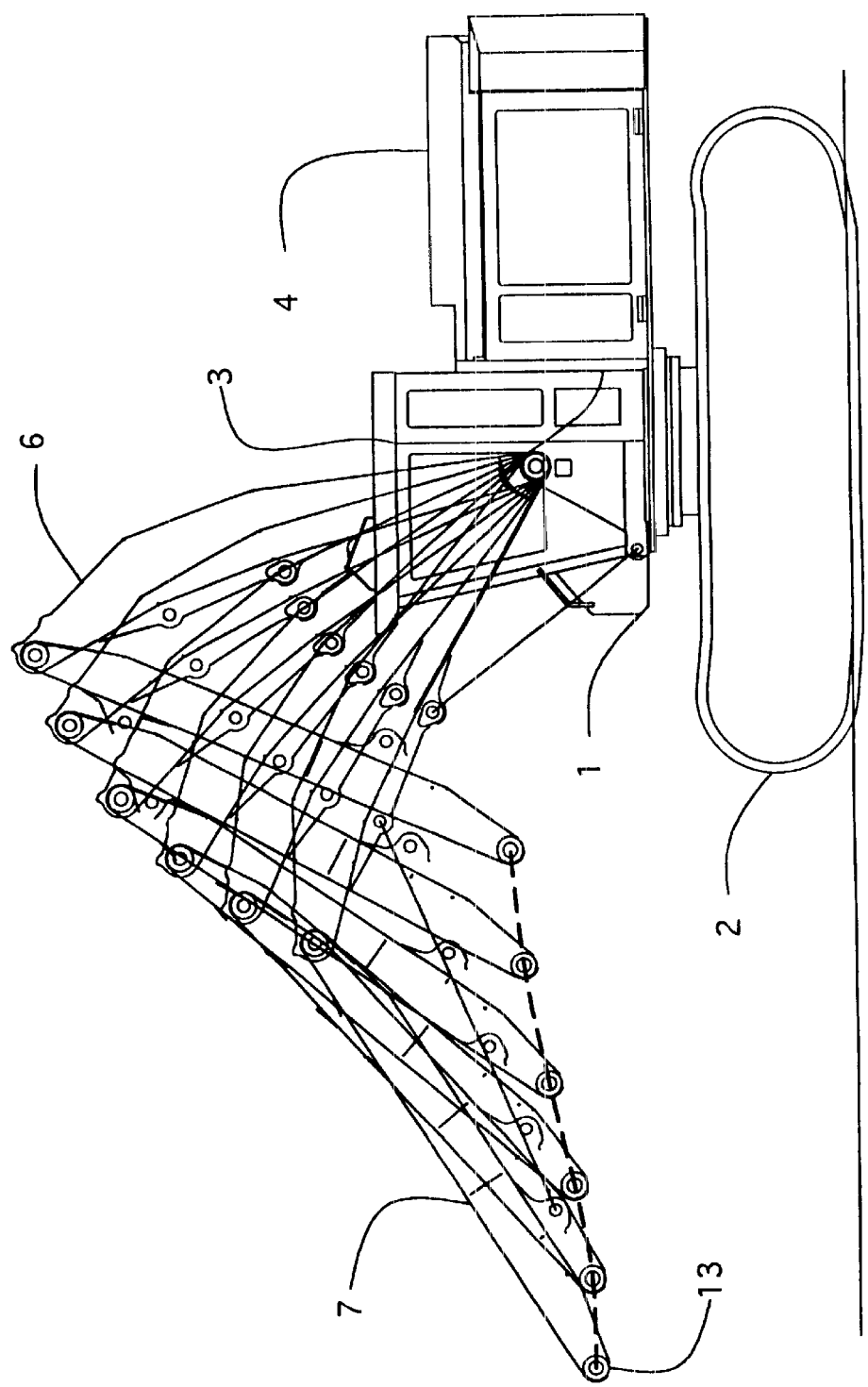
FIG. 12 is a side elevation view showing a typical desired boom travel path.

It should be understood that, while these descriptions may appear to infer that a perfectly horizontal reach travel with a perfectly vertical head is a strict requirement, that is almost never so. An operator often needs to superimpose some lift and tilt adjustments to accommodate terrain, tree and various other conditions. Machines with marginal stability at long reach might be better with a slight upward incline to the boom end path to compensate for the vehicle tipping forward in soft ground. Other operations with peculiar piling needs may want the head to rise as it is pulled in towards the carrier. At times it could be desired to tilt an accumulating felling head slightly rearward or a delimber slightly forward when the boom end is withdrawn with trees in the head. Such variations can often be designed into knuckle boom geometry when using the reach and lift control of this invention. FIG. 12 shows a typical acceptable boom point travel path, for example.

The energy savings provided by this invention are very substantial, and accordingly machine size and power provided is reduced significantly, or the power saved in reaching is used in speed to gain productivity.

What is claimed is:

1. A knuckle boom apparatus, comprising:
    a machine base;
    a hoist boom having a proximal end pivoted to the machine base, and a distal end remote therefrom;
    a stick boom having a proximal end pivoted to the distal end of the hoist boom, and a distal end;
    at least one hydraulic hoist cylinder mounted between said machine base and said hoist boom;
    at least one hydraulic stick cylinder mounted between said hoist boom and said stick boom;
    a hydraulic circuit for operatively supplying hydraulic oil to said cylinders, wherein said hydraulic circuit comprises at least one hydraulic conduit line connecting respective ports of said hoist and stick cylinders so as to allow hydraulic oil to shunt between said pressurized ends of said hoist and stick cylinders during operation, said shunting thereby allowing reaching of said distal end of said stick boom; and
    means for controlling said reaching.

2. A knuckle boom apparatus as recited in claim 1, wherein said means for controlling said reaching comprises at least one hydraulic reach cylinder connected to produce extension and retraction of said distal end of said stick boom.

3. A knuckle boom apparatus as recited in claim 1, further comprising a tree-working tool mounted at said distal end of said stick boom.

4. A knuckle boom apparatus as recited in claim 2, further comprising a tree-working tool mounted at said distal end of said stick boom.

\* \* \* \* \*